(12) United States Patent
Heyworth

(10) Patent No.: US 7,656,445 B2
(45) Date of Patent: Feb. 2, 2010

(54) IN-SITU COMPONENT MONITORING

(75) Inventor: Harold Heyworth, Loughborough (GB)

(73) Assignee: Rolls-Royce PLC, London (GB)

( * ) Notice: Subject to any disclaimer, the term of this patent is extended or adjusted under 35 U.S.C. 154(b) by 583 days.

(21) Appl. No.: 11/450,334

(22) Filed: Jun. 12, 2006

(65) Prior Publication Data
US 2007/0085904 A1    Apr. 19, 2007

(30) Foreign Application Priority Data
Jul. 9, 2005    (GB) .................................. 0514149.4

(51) Int. Cl.
*H04N 9/09* (2006.01)
*H04N 7/18* (2006.01)
*G06K 9/00* (2006.01)

(52) U.S. Cl. ...................... 348/265; 348/82; 348/86; 382/152

(58) Field of Classification Search ......... 382/141–152; 348/82–95, 36–37, 143–159; 356/237.1–237.6; 250/559.08; 700/90–306; 702/182–185
See application file for complete search history.

(56) References Cited

U.S. PATENT DOCUMENTS

| | | | |
|---|---|---|---|
| 4,616,932 A | 10/1986 | Parker | |
| 5,517,310 A * | 5/1996 | Paquette | 356/615 |
| 6,094,269 A * | 7/2000 | Ben-Dove et al. | 356/623 |
| 6,416,463 B1 * | 7/2002 | Tsuzuki et al. | 600/130 |
| 6,532,840 B2 * | 3/2003 | Hatley et al. | 73/866.5 |
| 6,700,668 B2 * | 3/2004 | Mundy et al. | 356/601 |
| 6,992,315 B2 * | 1/2006 | Twerdochlib | 250/559.08 |
| 7,064,811 B2 * | 6/2006 | Twerdochlib | 356/24 |
| 7,305,118 B2 * | 12/2007 | Leboeuf et al. | 382/152 |
| 2006/0078193 A1 * | 4/2006 | Brummel et al. | 382/152 |

* cited by examiner

Primary Examiner—Jason Chan
Assistant Examiner—Pritham Prabhakher
(74) Attorney, Agent, or Firm—Oliff & Berridge, PLC

(57) ABSTRACT

By mounting a camera to rotate with a rotating component to be viewed it is possible to review the whole component illuminated by a light source. Generally the component will be specifically marked with target markings to highlight its profile to allow images produced by the camera to be compared for distortion and displacement. Such in situ monitoring arrangements also allow profiling of the surface, and by projection of a grid or matrix onto a component surface any distortion in that matrix is indicative of variations in the surface or through use of astigmatic techniques variations in the incident image pattern can be utilized in order to determine distance variations.

19 Claims, 9 Drawing Sheets

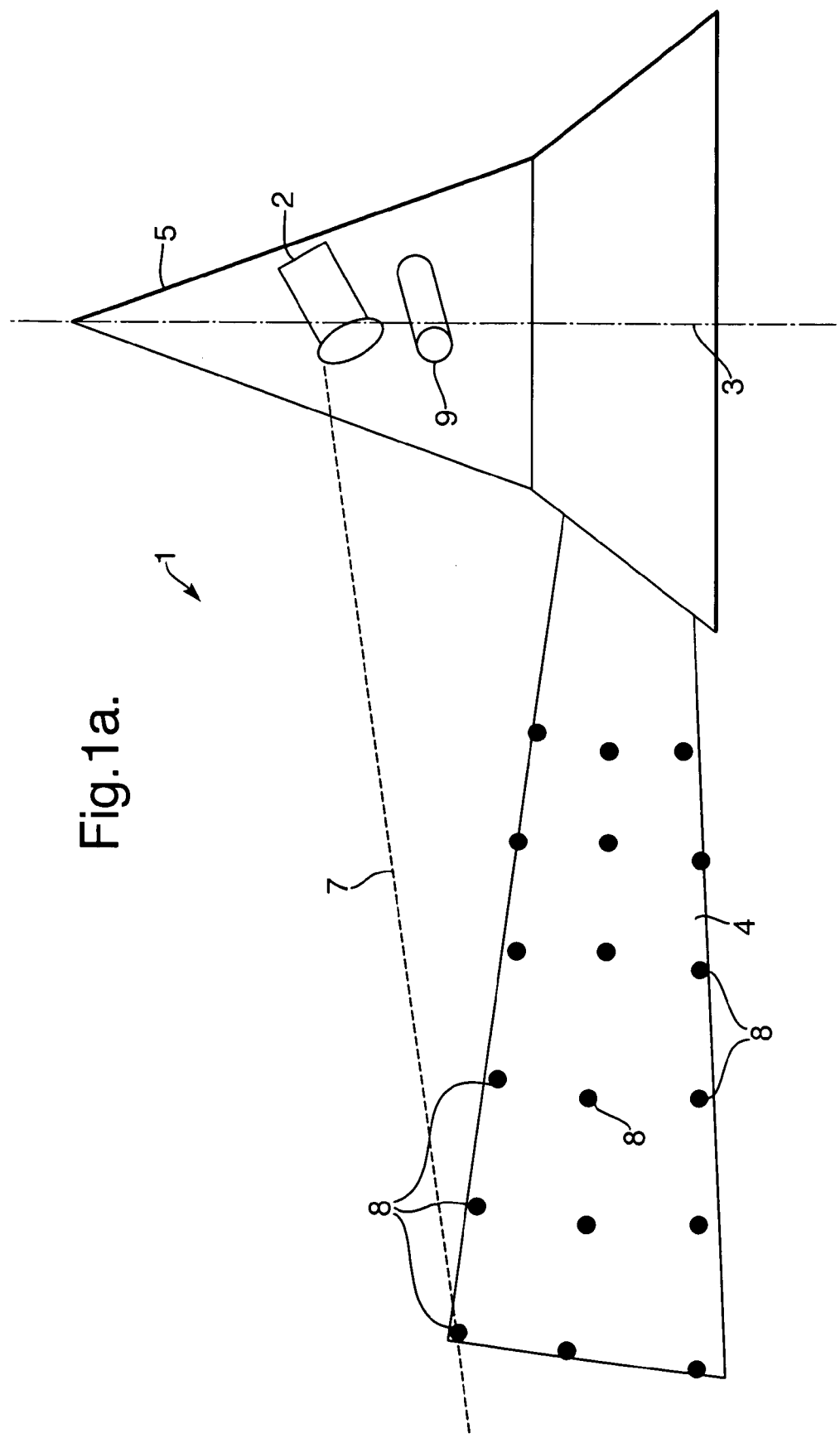

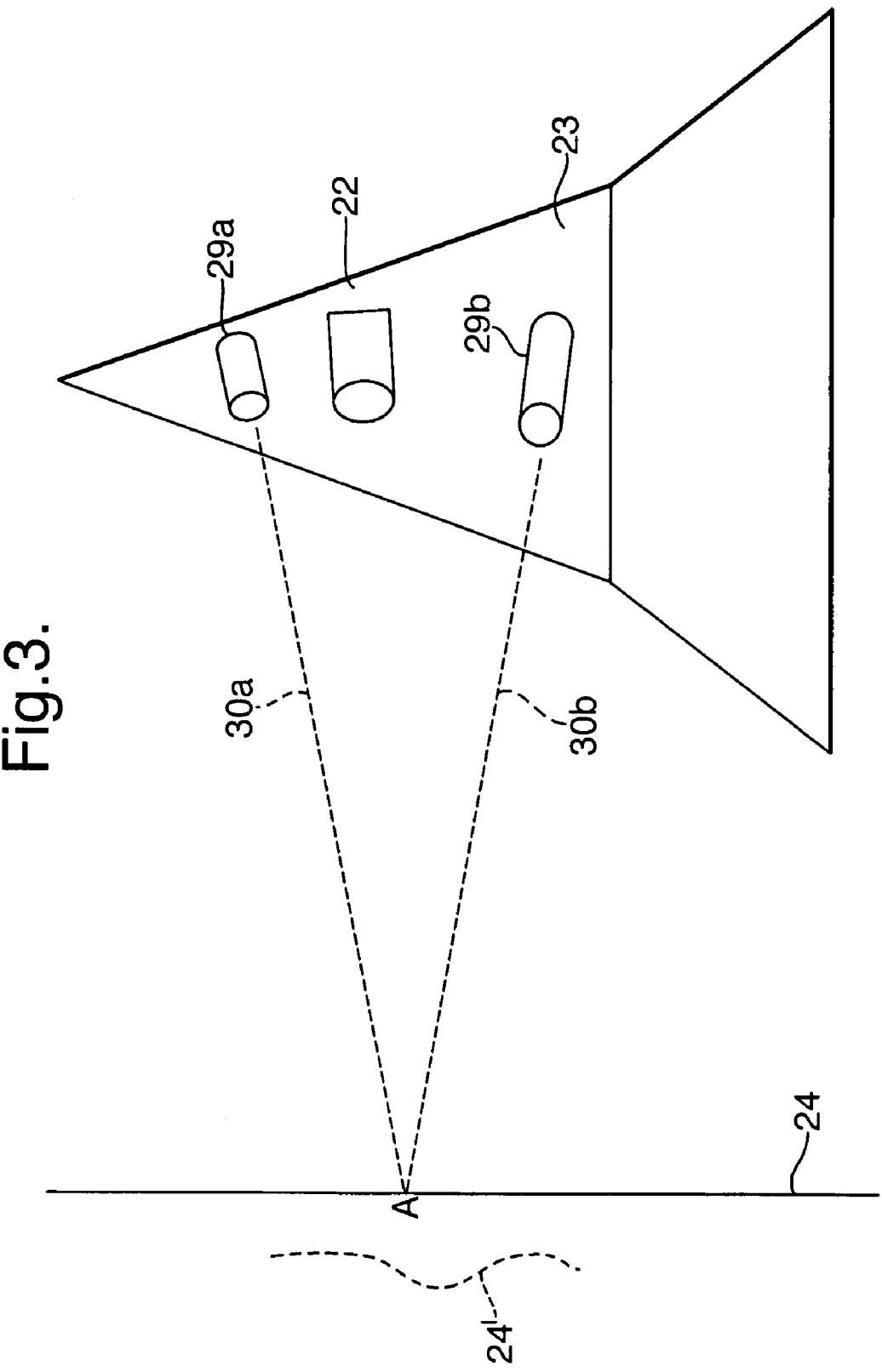

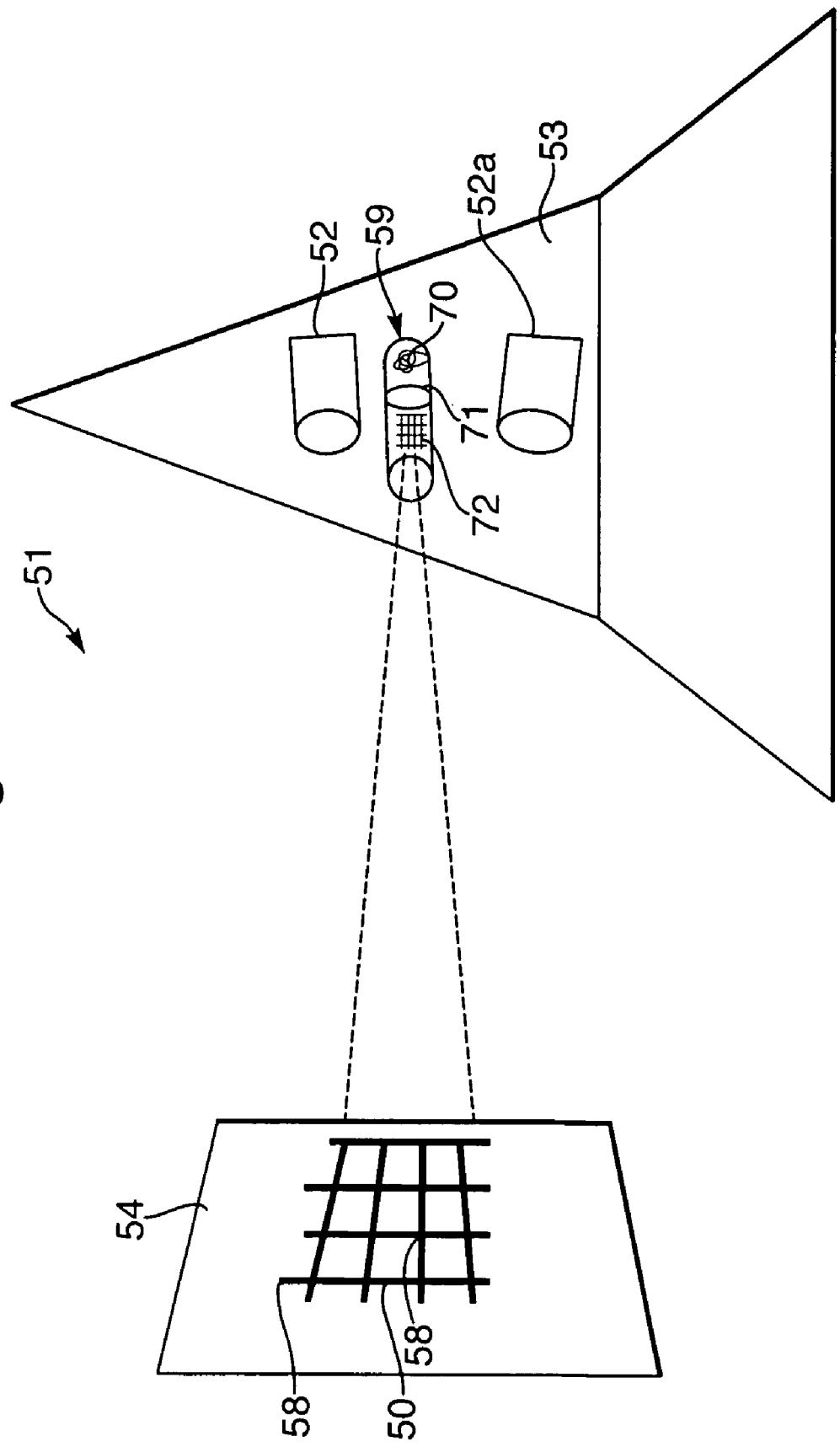

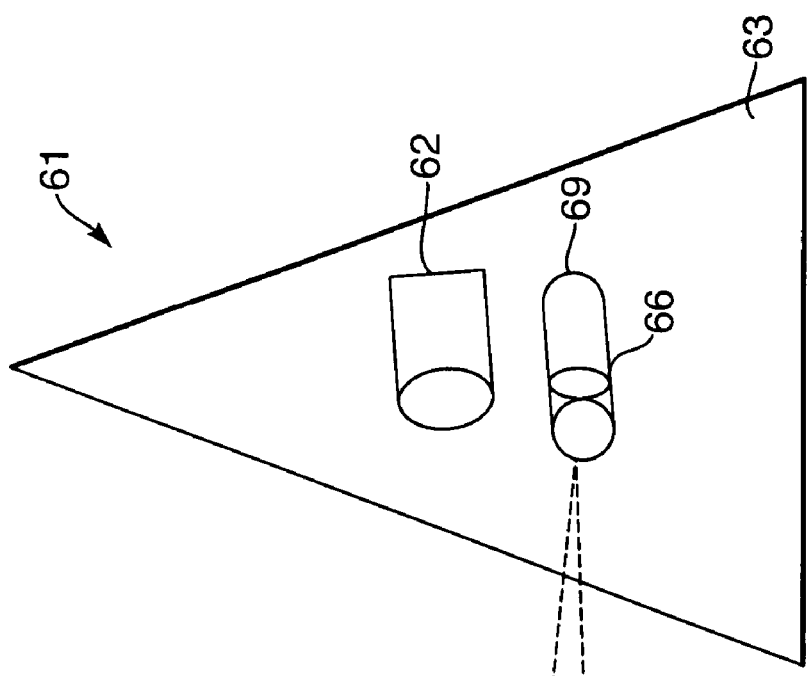
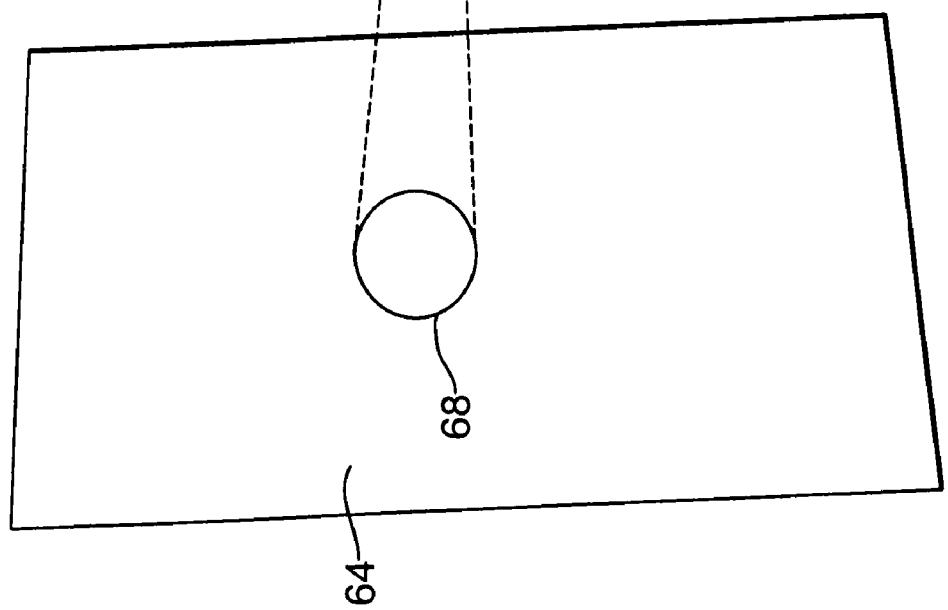
Fig.6a.

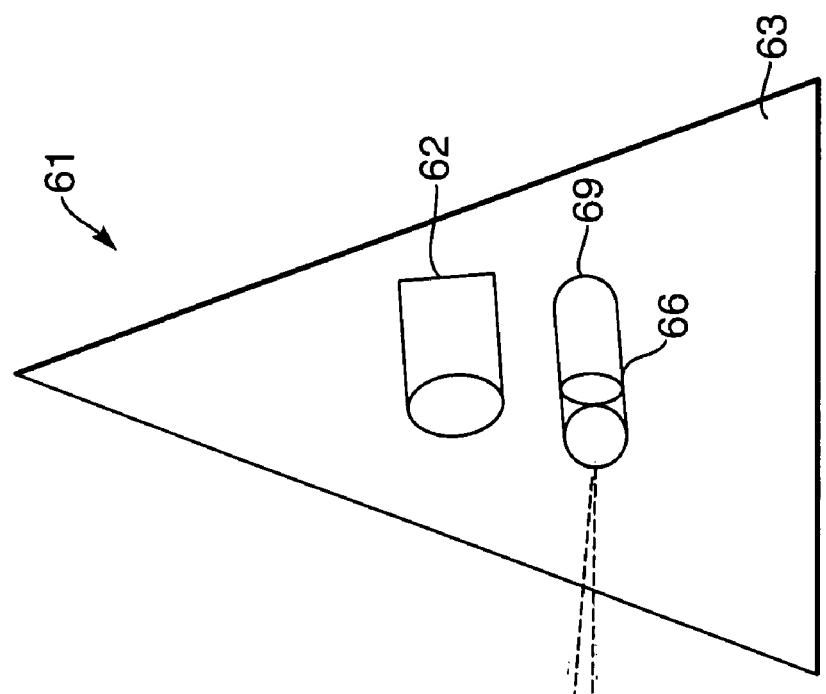
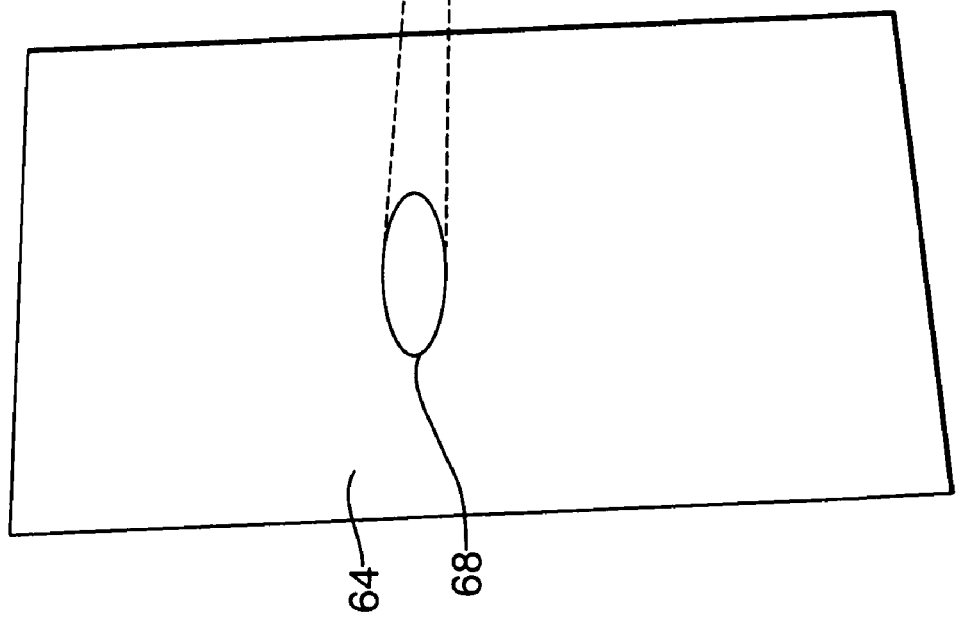
Fig.6b.

IN-SITU COMPONENT MONITORING

The present invention relates to in situ component monitoring and more particularly to monitoring of blades and turbines within a gas turbine engine.

It will be understood that monitoring of components such as blades within a gas turbine engine is necessary both during initial design and prototyping of an engine as well as ongoing monitoring of engine performance in service. With regard to rotating components such as turbine blades there is distortion of those blades under load and it is desirable to monitor such distortion for acceptability and safety purposes.

An example of a previous monitoring arrangement is described in U.S. Pat. No. 4,616,932. Thus it can be seen typically an aperture or window is provided in order to gain visual access to monitor the component in this case a blade. A casing window is inserted and a pulsed laser of high brightness is used in order to gain sufficient reflectivity for observation. Nevertheless, such high brightness lasers are unreliable and can present a significant hazard. The necessity of providing a window as well as a laser and its potential hazards along with unreliability creates limitations with regard to in situ testing of a gas turbine engines by these previous methods. Furthermore, it may be necessary to vary the incident height of the laser beam on the component which in turn requires considerable time and effort with regard to reconfiguring and setting blade heights and limits the possibilities with respect to simultaneous extraction of data at different heights on the blade or rotating component. A further disadvantage with projection of laser beam over a large distance is that it can be deviated.

It will be appreciated viewing a component such as a rotating blade through a casing window also has its limitations with respect of a distortion of the image viewed and so the amount of valuable component shape data extracted. It will be appreciated that current monitoring methods require an up stream laser and this itself can compromise the accuracy of the air flow loading on the blade.

There are potential problems and limitations upon convenient use of these prior monitoring arrangements in situations other than with ground based running of an engine. Finally, current monitoring methods limit blade shape determination toward one particular engine configuration.

In accordance with the present invention there is provided an in situ component monitoring arrangement for a gas turbine engine, the arrangement comprising a camera and light source, the light source providing in use illumination of the component as it rotates and the camera arranged to receive, in use an image from the component, a controller comparing images of the component to monitor variation in the component, the arrangement characterised in that the camera is arranged to rotate with the component in use and obtain images of at least a target portion of the component to allow comparison by the controller of the images received to determine variation in the component.

The light source may be arranged to rotate with the component.

Generally, the target portion is enhanced by the camera in the image obtained.

Such enhanced spatial identification is possibly provided by reflective target features in the target portions.

Alternatively, the target portion is rendered more specifically identifiable by portions of a recognisable grid in the target portion.

Typically the camera is coupled to the controller by a wireless connection.

Possibly the wireless connection may be an optical beam coupling.

Alternatively, the camera is coupled to the controller by a rotatable coupling.

Further alternatively, the camera and the controller are co-mounted to rotate with each other and the controller incorporates storage means to store images for subsequent comparison.

Typically, the camera and the component rotate at substantially the same speed so effectively the images obtained are of an equivalent target portion of the component.

Possibly, the arrangement incorporates more than one camera and target portion for different parts of the component.

Alternatively, the arrangement incorporates more than one camera and each camera monitors a variation in a discrete and different direction on the component to the other camera.

Preferably, the, or each, camera comprises an axis which is arranged coincident with a rotational axis of the component.

Alternatively, a mirror is arranged to reflect the image from the target portion of the component into the camera, and the mirror is arranged to rotate about the axis of the component.

Generally the controller is arranged to compare a reference image of the target area when the component is stationary with a current image of the target area in order to determine variation. Generally, that variation is distortion.

Preferably, the component is a rotor blade of a gas turbine engine and the camera is mounted within a spinner fairing of the gas turbine engine.

Embodiments of the present invention will be now described by way of example with reference to the accompanying drawings in which:

FIG. 1 is a schematic cross-section depicting the configuration of an in situ component monitoring arrangement in accordance with the present invention;

Figure 1B:
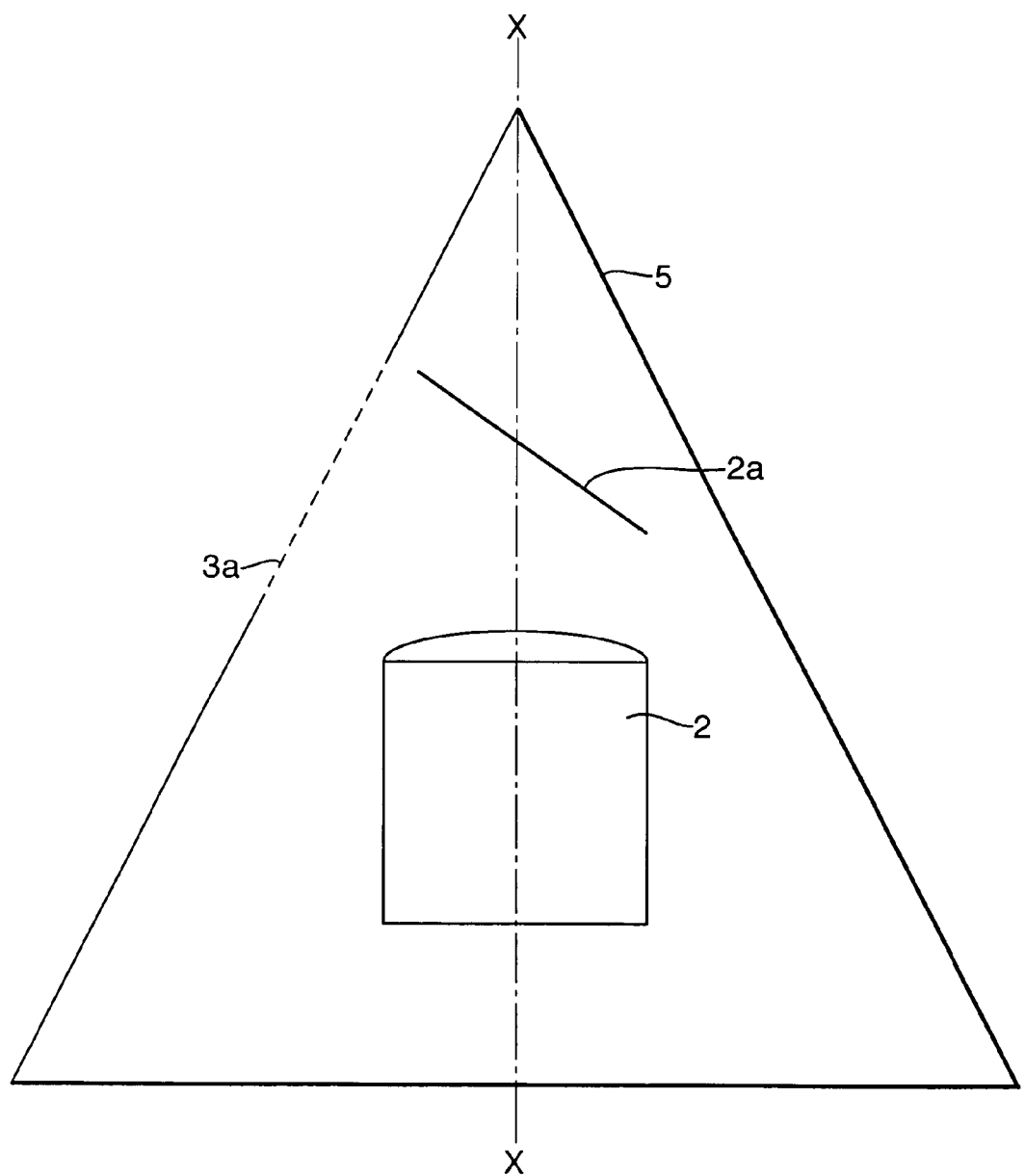
FIG. 1b is a schematic cross-section depicting an alternative configuration of an in situ component monitoring arrangement in accordance with the present invention.

FIG. 3 provides a schematic illustration utilising a triangulation type regime to determine tube or wall profiling;

FIG. 4 illustrates schematically the images possible with respect to the triangulation configuration used for tube or wall profiling depicted in FIG. 3;

FIG. 5 provides a schematic illustration of a wall distortion in situ monitoring arrangements in accordance with the present invention; and, FIG. 6 illustrates an in situ monitoring arrangement in accordance with the present invention to determine distance to an annulus utilising an astigmatic system of image projection.

As indicated above there are potential problems with previous systems which utilise cameras which view a component through a window. The window may distort the image received and there may be problems with actual provision of a window and a need to re-configure for different target parts of the component to be monitored.

The present in situ component monitoring arrangement is particularly directed towards components which rotate and are subject to distortion as a result of rotational loads placed upon that component. A typical example of a rotating component is a turbine blade assembly in a gas turbine engine. By combining a camera to monitor the component with that rotating component it will be appreciated that the image viewed by the camera is substantially of the same blade target portion as the combination rotates. There may be problems with respect to vibration but these can be generally minimised and image judder corrected.

FIG. 1 provides a rudimentary schematic illustration of an in situ component monitoring arrangement in accordance with the present invention as a part cross section. Thus, the arrangement 1 has a camera 2 mounted in a mounting 3, to which a rotating component in the form of a turbine blade 4 are secured. An aerodynamic covering 5 is provided to the mounting 3 for the blades 4. It will be understand that the camera and the blades 4 rotate with the mounting 3 generally on an axis x-x so the blades 4 are subject to load distortions. It will be understood that generally a number of blades 4 will be mounted in the mounting 3. The camera 2 is arranged to receive an image from a target portion of the rotating component 4. In FIG. 1 this is substantially one side 6 of the rotating component 4. In such circumstances distortions and other alterations in the shape of the blade 4 may be viewed by the camera 2 in the image taken and schematically illustrated by dot lines 7.

In order to emphasise position within the image 7 taken by the camera 2 normally identifiable markings 8 as noticeable targets will be placed on the surface 6. Markings can be dots, stripes, crosses or such like. The markings 8 will generally be regular in distribution but it will be understood it is alterations in these marking positions as a result of distortion that are of importance. Thus, the images received by the camera 2 at different stages of the rotational operation will be compared so that there is like for like comparisons of the markings 8 in the two images for comparison, thus whether there is a regular distribution of target markings or not is of limited importance. The markings 8 can simply take the form of reflective patches or dots or distinct features such as triangles or other shapes or patterns on or attached to the rotating component.

It will be understood in order to enhance definition and clarity of the image normally a high intensity light source will be used. Generally, this light source 9 will also be arranged to rotate with the camera 2 on the mounting 3. However, it will also be understood that other forms of illumination of the surface 6 may be used provided there is highlighting of the markings 8 or to render the component appropriately illuminated as a target portion for image comparison.

In view of the above it will be the appreciated that the present arrangement 1 comprises the camera 2 and the light source 9 in order that the camera 2 can obtain images of the surface 6 of the component 4. These images are then utilised to determine distortion of the component 4 under load as it rotates. In such circumstances it is necessary to either provide a wireless link or a slip ring coupling or other data transfer mechanism to allow transmission of those images to an appropriate controller. Alternatively, an image storage device could be provided within the mounting and this retained until after testing when the images will then be retrieved for analysis. However, more normally as indicated some form of wireless image transmission to a remote controller and processing device will be utilised in order to allow real time monitoring of the component.

A normal monitoring episode will include use of the camera 2 to determining an image of the stationary component 4 and this image then relayed to a storage device as a reference image. Once the rotating component 4 rotates as indicated stresses and strains and other loads are presented to the component 4 which will cause distortion and displacement of the component 4. These distortions and displacements of the blade are then viewed by the camera 2 and different current in use images obtained. Again these differ in use as images at different rotation speeds and other loadings of the component 4 are relayed by the camera 2 to a remote controller and processor device. The images are compared in order to identify and compare the distortions and displacements in the rotating equipment.

FIG. 1b shows a preferable arrangement with the camera 2 and mirror 2a on the rotation centre line x-x. Where the present invention is used in a gas turbine engine, the component being monitored is a fan blade 4 and the camera 2 is housed in a spinner fairing 5 (aerodynamic covering). The camera 2 is mounted so that its centre axis is coaxial with that of the rotational axis of the spinner fairing 5, thereby reducing centrifugal forces on the camera and/or its mountings. A mirror 2a is positioned to reflect images of the fan blade 4 into the camera 2 via a window or aperture 3a included in the aerodynamic covering 5. Preferably, the mirror 2a is arranged to rotate about its own central axis coincident with the axis of the component (4).

Figure 2:
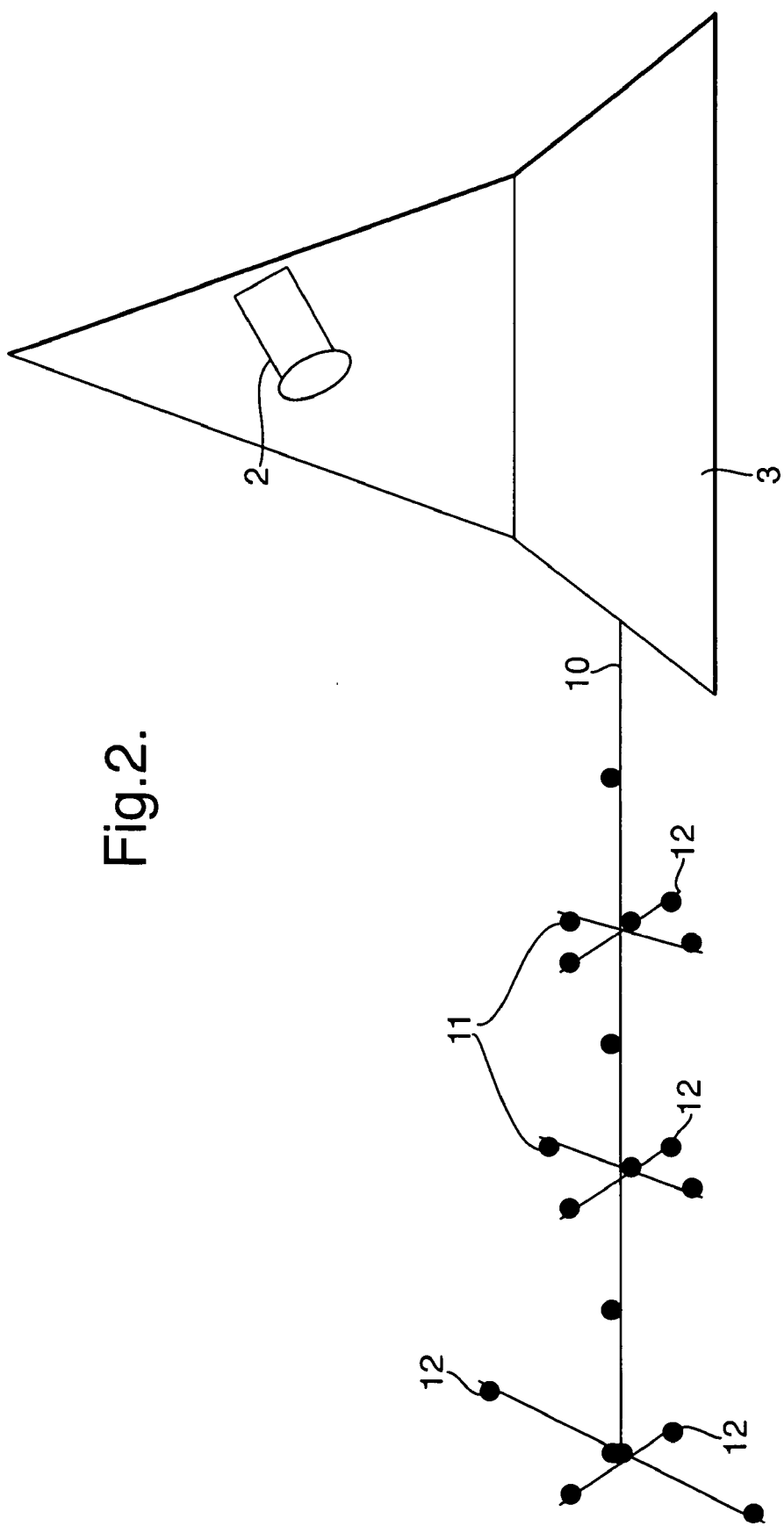
FIG. 2 illustrates means for in situ calibration of the arrangement depicted in FIG. 1.

For determining the exact values of displacements in a component such as a blade assembly for a gas turbine engine a separate calibration device is generally used. This calibration device is illustrated in FIG. 2. As previously the camera 2 is mounted in a mounting 3 but a calibration tool 10 is utilised to calibrate the image received by the camera 2. It will be understood there will be a number of parallax and other optical effects upon the image received by the camera 2 so that providing a calibration tool 10 which is accurately incremented with noticeable axial markers 11 and radial calibration spokes 12 it will be possible to calibrate the actual image received by the camera 2 in terms of axial, radial and circumferential co-ordinate position for the whole volume of the blade mounted in the mounting 3. In such circumstances the initial stationary image can be accurately quantified and then variations in the different images produced as the blade is distorted and displaced with rotational load can be simply compared to the calibrated image reference frame, provided by images of the tool 10.

By allowing the camera 2 to rotate with the component it will be understood a consistent image of a particular target portion of the blade or component is achieved. Such arrangements remove the requirement for high brightness pulsed lasers and providing a viewing aperture or window in the casing so that the camera can view a rotating component. It will be understood that as the camera 2 is essentially moving with the target area from which an image is taken. Thus, with limited time delay and shift between the image reflection and receipt of the image by camera 2 it is possible to use a relative slow camera exposure time and consequentially high spatial resolution of the image. Essentially the camera is substantially viewing the same part of the component surface in a fixed rotational relationship. The cameras may be subject to vibration but as there will be relatively slow variation in displacement and distortion effects on the component, it will be possible to use relatively long exposure times to acquire an image in comparison.

By rotating the camera 2 with the component 4 it is possible to minimise the time required to acquire a whole component shape data set. The component 4 can be viewed along its whole length simultaneously with markings 8 or otherwise in order to provide fixed references within the whole component 4 for comparison between the images received.

As indicated above generally a like for like image comparison will be performed in accordance with an in situ monitoring arrangement in accordance with the present invention. Thus axial, radial and circumferential movements of optically markings 8 between the images will be compared and contrasted in order to denote distortions either globally over the whole component 4 or localised variations. It must be appreciated that a component may bow or twist or be otherwise distorted or displaced in terms of dimensions for rotational loads.

As will be described later with regard to association of the present arrangement with a controller a number of images can be compared with the stationary reference or earlier images in order to allow analysis of the component under rotational load.

Alternative refinements of the present in situ monitoring arrangement are described below with regard to FIGS. 3-6. These alternatives relate respectively to utilisation of the arrangement for profiling of a tube or pipe, determination of wall distortion and determination of distance to an annulus.

Referring to FIGS. 3 and 4, which respectively illustrate profiling of a tube or pipe utilising a triangulation technique. As previously a camera 22 is mounted in a mounting 23, which is generally of an aerodynamic nature. The mounting 23 also incorporates light sources 29a and 29b, which project respective beams of light towards the surface 24 of a tube or pipe within which the rotating mounting 23 is positioned. These beams coincide at a position A and an image is acquired by the camera 22. In such circumstances movement of the surface 24 in the direction of either arrowhead B or arrowhead C will result in displacement of the co-incident spots for the beams from the light sources 29a and 29b. These displacements in the incident spots are viewed in the image received by the camera 22 and therefore can be utilised in order to determine the profile of the tube 24. If the mounting 23 is fixed then profiling of a particular circumference of the surface 24 will be achieved. If the mounting 23 is arranged to progress and move along the tube or pipe from one end to the other then the whole, or part, of the surface 24 from one end to the other of the pipe can be profiled in terms of displacements of the surface 24 in the direction of arrowheads B, C.

FIG. 4 illustrates three different incident spot positions for the light beams projected by the light sources 29 in FIG. 3. The light beams could also provide lines of illumination but for example the situation with spots is described below. Thus, in FIG. 4a it will be noted that the image received by the camera 22 is substantially of the spots 20a and 21a which are close together and therefore are consistent with the calibrated distance where the beams from the light sources 29 should coincide. Displacement in the direction of arrowhead B or arrowhead C causes the displacement of the spots from each other in the image viewed by the camera. With displacement in the direction of arrowhead B there is cross over of the beams 30a, 30b such that the spots 20b, 21c are displaced from each other either side of the notional coincidence position for the beams 30 denoted by a broken line 25 in FIG. 4b. If there is displacement in the direction of arrowhead C there is foreshortening of incidence of the beams 30 upon the surface 24 such that the spots 20c, 21c are again displaced relative to notional coincidence position 25 but in these circumstances rather than crossing over the beams 30 have become incident upon the surface 24 prior to such crossover so the spots 20c, 21c are upon opposite sides to that depicted in FIG. 4b. The light sources 29a and 29b could also be in the plane of rotation (in FIG. 3); i.e. either side of the nose cone (5) at the same axial position.

Figure 4A:
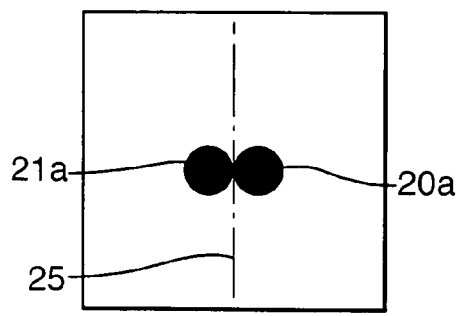
Figure 4B:
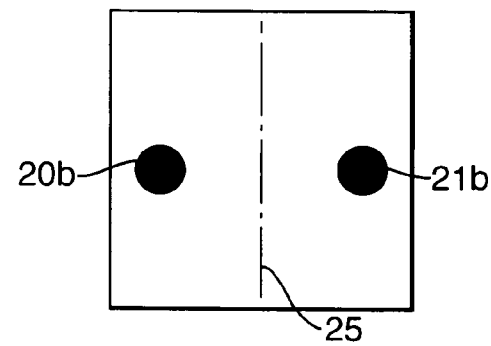
Figure 4C:
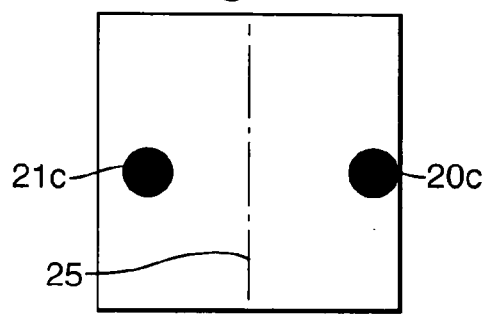
Figure 4D:
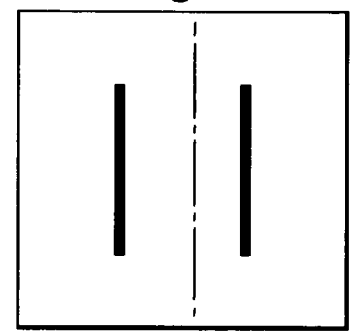
Figure 4E:
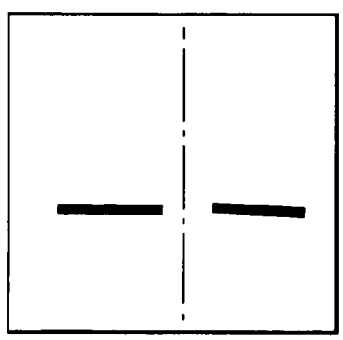
Figure 4F:
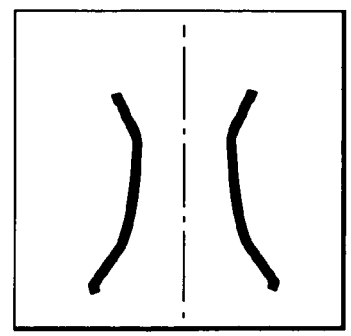

As indicated above rather than incident spots it is possible for the light beams to project lines incident upon a component. Thus FIGS. 4d to 4f may be created by incident line projection on a component. FIG. 4d is equivalent to FIG. 4b above. The distance between the lines on FIG. 4d gives the radial displacement of A in FIG. 3. A waviness in the lines as denoted in FIG. 4f gives an indication of the radial variations at particular circumferential locations during a rotational episode. In such circumstances, it will be appreciated that the depiction in FIG. 4f showing wavy lines gives an indication of the shape of the casing as shown by the dashed line 24' in FIG. 3. Thus it will be appreciated that distortion of the casing gives non-straight (wavy) lines in the image. FIG. 4e is an equivalent of 4a above. The spots and lines can be made individually distinct in their appearance so that no ambiguity will exist in the radial motion perceived.

These variations in the displacement of the spots 20, 21 c are utilised and observed in the image camera 22 to calculate wall displacement and therefore allow profiling of the surface 24 either through operational episodes or structural determination.

FIG. 5 describes an in situ monitoring arrangement 50 in accordance with the present invention in which distortion in a wall surface 54 is determined by viewing differences in the image received by a camera 52 of a projected grid or matrix 50 projected onto the wall or surface 54 by a light projection system 59 comprising a light source 70, a lens 71 and a grid/matrix 72. As previously the camera 52 and light projection system 59 are mounted in a mounting 53, which generally rotates such that the camera uses the same grid 50 projected by the projected system 59. It is understood if this system 59 is rotated then generally the mounting 53 will rotate at the same speed as the surface 54 rotation such that the subject target area of the surface 54 is therefore consistent. Alternatively the wall/surface 54 may be stationary and the mounting 53 rotated in order that the grid is therefore projected upon different parts of wall 54. In either event data points 58 are compared in the images received by the camera 52 in order to determine circumferential and axial movements of the surface 54.

The use of more than one camera 52, 52a as indicated by the additional camera 52a allows for improved monitoring of the variations of the surface wall 54 in both the radial and its orthogonal direction. However, the discrete directions monitored by each camera need not be orthogonal, but any angle therebetween.

The surface wall 54 may be coated with a reflective material to improve the return light signal. The grid pattern does not need to be a rectilinear design, but may be any recognisable or structured light pattern. A regular pattern could be viewed with a Moire type filter to enhance distortion information. Also the arrangement within the aerodynamic covering 5 could for example comprise a shearography or interferometry system to perform distortion measurement on the wall 24.

Figure 6C:
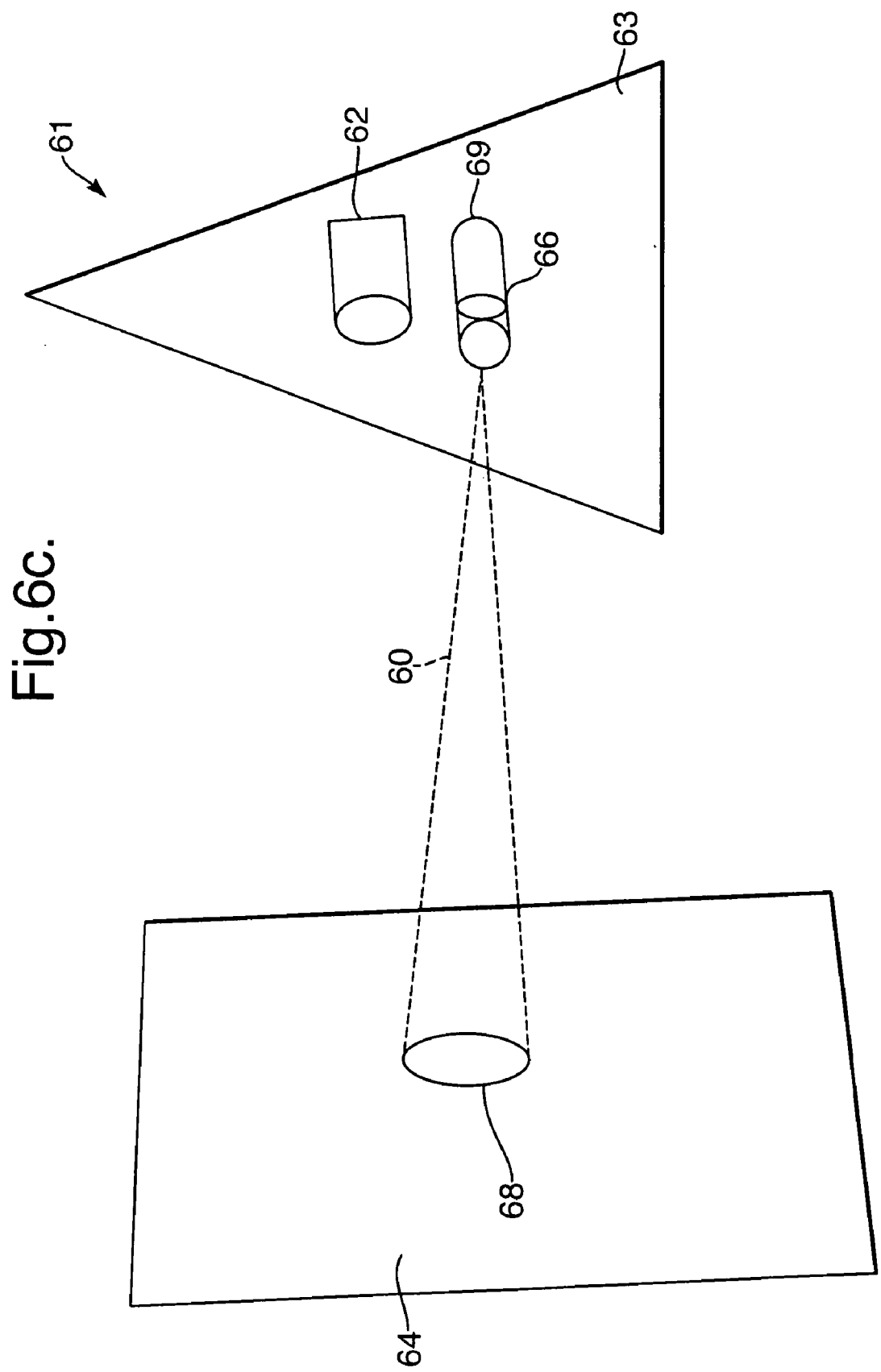

FIG. 6 illustrates means of determining distance from an annulus utilising an astigmatic projection system. Thus, as previously the arrangement 61 has a camera 62 and a light source 69 mounted within a mounting 63 such that the mounting 63 rotates with both the camera 62 and the light source 69. The light source 69 incorporates a lens system in order to project a beam 60 towards a surface 64 such that the incident pattern 68 on the surface 64 varies dependent on distance. This variation in the incident pattern 68 on the surface 64 is achieved through the lens mechanism 66, which forms part of the light source 69. In the above circumstances it will be appreciated that there are three general scenarios dependent on distance and respectively illustrated in FIG. 6(a), 6(b), 6(c). In FIG. 6a correct or calibrated distance is achieved by creation of a perfectly round pattern 68 on the surface 64. This pattern will be observed as an image by the camera 62 and therefore distance determined.

In FIG. 6b the surface 64 is too near to the mounting 63 or annulus. In such circumstances, the pattern 68b is oval and lateral as a result of the lens mechanism 66 in the light source 69. Again this pattern 68b is viewed, as an image by the camera 62. The extent of the oval shape in the pattern 68b can be compared with calibrated values in order to determine the distance between the annular position of the mounting 63 and the surface 64.

In FIG. 6c the surface 64 is further than the calibrated value from the annulus of the mounting 63 so that the incident pattern 68c is now again oval but in a vertical orientation. This pattern 68c is again viewed and received as an image by camera 62 in order to determine the distance from the mounting 63.

It will be understood that the patterns 68 depicted in FIG. 6 are again utilised in comparing images received by the camera 62 for determination of distance from the mounting 63 as an annulus. In such circumstances it is possible to profile the surface 64 in terms of changes in the incident pattern 68.

With the distance finding embodiment depicted in FIG. 6 the arrangement may be initially calibrated by determination of the pattern 68 in terms of how round its shape, that is to say its distortion to an oval and whether that oval in lateral or vertical or inclined in order to provide a set of reference images. Thus, in use the actual distance can be determined with some accuracy by comparison of the test camera image with the reference images.

As indicated above generally the images from the camera will be transferred to an appropriate controller device in order to facilitate the comparison described above.

The use of the above systems could be employed in an aircraft engine whilst in flight to observe distortions, damage or ice build up on the wall 64 of rotor blades. It could also be used to detect ingestion of foreign objects into an aeroengine and subsequent damage thereto.

Although visible light is the preferred electromagnetic waveband of use as described herein, the utilisation of infrared or microwave bands may be preferable for some or all of the above devices, dependant on their appropriate efficacy in any given environment.

I claim:

1. An in situ component monitoring arrangement for a gas turbine engine, the arrangement comprising:
    a camera and light source, the light source providing in use illumination of the component as it rotates and the camera arranged to receive, in use an image from the component; and
    a controller comparing images of the component to monitor variation in the component,
    wherein the camera is arranged to rotate with the component about a common axis of rotation and obtain images of at least a target portion of the component to allow comparison by the controller of the images received to determine variation in the component.

2. The arrangement of claim 1, wherein the target portion is enhanced by the camera in the image obtained.

3. The arrangement of claim 2, wherein enhanced spatial identification is provided by reflective target features in the target portion.

4. The arrangement of claim 2, wherein the target portion is rendered more specifically identifiable by portions of a recognizable grid in the target portion.

5. The arrangement of claim 1, wherein the camera is coupled to the controller by a wireless connection.

6. The arrangement of claim 5, wherein the wireless connection comprises an optical beam coupling.

7. The arrangement of claim 1, wherein the camera is coupled to the controller by a rotatable coupling.

8. The arrangement of claim 1, wherein the camera and the controller are co-mounted to rotate with each other and the controller incorporates storage means to store images for subsequent comparison.

9. The arrangement of claim 8, wherein the camera and the component rotate at substantially the same speed so effectively the images obtained in use are of an equivalent target portion of the component.

10. The arrangement of claim 1, wherein the arrangement incorporates more than one camera and target portion for different parts of the component.

11. The arrangement of claim 1, wherein the arrangement incorporates more than one camera and each camera monitors a variation in a discrete and different direction on the component to the other camera.

12. The arrangement of claim 1, wherein the, or each, camera comprises an axis which is arranged coincident with a rotational axis of the component.

13. The arrangement of claim 12, wherein a mirror is arranged to reflect the image from the target portion of the component into the camera, and the mirror is arranged to rotate about the axis of the component.

14. The arrangement of claim 1, wherein the controller is arranged to compare a reference image of the target area when the component is stationary with a current image of the target area in order to determine variation.

15. The arrangement of claim 1, wherein the light source is arranged to rotate with the component in use.

16. The arrangement of claim 1, wherein the component is a rotor blade of a gas turbine engine.

17. The arrangement of claim 1, wherein the camera is mounted within a spinner fairing of a gas turbine engine.

18. A gas turbine engine including the in situ component monitoring arrangement of claim 1.

19. An in situ component monitoring arrangement for a gas turbine engine, the arrangement comprising:
    a camera and light source, the light source providing in use illumination of the component as it rotates and the camera arranged to receive, in use an image from the component; and
    a controller comparing images of the component to monitor variation in the component,
    wherein the camera is arranged to rotate with the component at substantially the same speed and obtain images of at least a target portion of the component to allow comparison by the controller of the images received to determine variation in the component.

* * * * *